(12) United States Patent
Christiansen et al.

(10) Patent No.: US 7,496,609 B2
(45) Date of Patent: Feb. 24, 2009

(54) DIRTY SHUTDOWN RECOVERY OF FILE SYSTEM FILTERS

(75) Inventors: Neal R. Christiansen, Bellevue, WA (US); Ravinder S. Thind, Kirkland, WA (US); Ravisankar Pudipeddi, Bellevue, WA (US); Sarosh Cyrus Havewala, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 153 days.

(21) Appl. No.: 11/217,986

(22) Filed: Sep. 1, 2005

(65) Prior Publication Data

US 2007/0061279 A1   Mar. 15, 2007

(51) Int. Cl.
*G06F 12/00* (2006.01)
*G06F 17/30* (2006.01)
*G06F 17/00* (2006.01)

(52) U.S. Cl. .................. 707/202; 707/9; 714/2
(58) Field of Classification Search .......... 707/202; 714/2, 52
See application file for complete search history.

(56) References Cited

U.S. PATENT DOCUMENTS

| | | | | |
|---|---|---|---|---|
| 5,832,516 A | * | 11/1998 | Bamford et al. | 707/202 |
| 6,144,999 A | * | 11/2000 | Khalidi et al. | 709/219 |
| 6,185,663 B1 | * | 2/2001 | Burke | 711/156 |
| 6,732,124 B1 | * | 5/2004 | Koseki et al. | 707/202 |
| 6,988,171 B2 | * | 1/2006 | Beardsley et al. | 711/144 |
| 7,024,583 B2 | * | 4/2006 | Nguyen et al. | 714/5 |
| 7,305,584 B2 | * | 12/2007 | Eguchi et al. | 714/15 |
| 7,401,093 B1 | * | 7/2008 | Hamilton et al. | 707/102 |

* cited by examiner

*Primary Examiner*—Tony Mahmoudi
*Assistant Examiner*—Jacob F Bétit
(74) *Attorney, Agent, or Firm*—Woodcock Washburn LLP

(57) ABSTRACT

File system metadata regarding states of a file system affected by transactions is tracked consistently even in the face of dirty shutdowns which might cause rollbacks in transactions which have already been reflected in the metadata. In order to only request time- and resource-heavy rebuilding of metadata for metadata which may have been affected by rollbacks, reliability information is tracked regarding metadata items. When a metadata item is affected by a transaction which may not complete properly in the case of a problematic shutdown or other event, that metadata item's reliability information indicates that it may not be reliable in case of such a problematic ("dirty" or "abnormal") event. In addition to flag information indicating unreliability, timestamp information tracking a time of the command which has made a metadata item unreliable is also maintained. This timestamp information can then be used, along with information regarding a period after which the transaction will no longer cause a problem in the case of a problematic event, in order to reset the reliability information to indicate that the metadata item is now reliable even in the face of a problematic event.

15 Claims, 4 Drawing Sheets

DIRTY SHUTDOWN RECOVERY OF FILE SYSTEM FILTERS

BACKGROUND

In modern computer systems, the storage of data to certain memory areas is managed by a file system. This file system is often difficult or impossible to add to or modify directly, because the file system may be complex or proprietary, and often is both. In certain cases, however, it may be desirable to add storage-related functionality to a computer system. For example, where a file system does not establish and enforce limits on the usage of storage by individual users, adding functionality which enforces such limits may be desirable. As discussed, modifying the file system to add such functionality may be difficult or impossible to do.

In order to add storage-related functionality to a computer system, then, functionality may be added via a file system filter rather than by changing the file system. In order to create and use a filter, no change needs to be made to the file system. Rather, the filter sits on top of the file system, with data traffic to the file system passing through the filter. In this way, the filter can monitor the internal status of the file system and, if necessary, block, modify, and/or enhance certain traffic. For example, if a quota system is needed in which the use by a given user of the storage managed by the file system is limited, a quota filter can be installed which monitors data traffic to the file system, discerns which traffic concerns write commands issued to the file system, and uses this information in order to determine what the relevant usage is for different specified users. The quota filter thus generates and saves file system metadata (data regarding the state of the file system) in order to track usage of the file system.

In addition to monitoring traffic, in some cases the quota filter blocks a write request to the file system which requests storage of data which would cause a quota policy (e.g., a limitation on the amount of data which can be stored in a particular directory by a particular user) to be violated. If necessary, the quota filter also sends appropriate messages back to the requesting entity regarding the situation.

While a quota system has been described, other filters may be installed which implement additional functionality which is based on monitoring or intercepting traffic to the file system. For example, encryption/decryption may be implemented using a filter. A hierarchical storage management (HSM) filter or "ghosting" filter may be used in order to implement a file achieving in a way which is invisible to the user, with files being moved from the file system according to a policy and provided by the filter if subsequently requested. For example, files may be moved from the file system to alternate storage if they have not been used for 30 days, and then, if a file which has been moved is the subject of a file system request, the filter, upon receiving the request, restores the file from the alternate storage.

One problem which occurs when such monitoring or interception of traffic to the file system is being implemented by a filter, and the computer system in which the file system is implemented shuts down in a manner which is not a clean shutdown. For example, if the system is power cycled or crashes and is rebooted, the shutdown procedures may not have time to execute. Such a shutdown is known as a dirty shutdown. Many file systems include techniques which allow the file system to recover from such dirty shutdowns without a loss of file system integrity. While maintaining the integrity of the file system, these file system techniques may cause behaviors which cannot be accurately tracked by a filter, and thus may endanger the integrity of the filter's metadata.

For example, an extending write request is a request which extends the size of a preexisting file. Where extending writes have been started but not completed before a sudden shutdown, in some file systems, such writes are rolled back by the file system upon rebooting. When this occurs, writes which have been logged by the quota filter as having occurred have in actuality been rolled back by the file system. Because of this, a filter may contain incorrect information. For example, where a quota filter is being used to track a user's writes, if one of the user's writes has been rolled back, the quota filter's assessment of how much space has been used by the user may be different from the actual usage. Such discrepancies may be significant, and the discrepancy between the actual state of the file system and the information maintained by a filter such as a quota filter about the state of the file system may only grow with time and additional dirty shutdown events. This can cause significant problems with the proper functioning of the filter. For example, in the case of a quota filter enforcing a certain restriction on how much space a specific user can use in a specific directory, where the quota filter does not have an accurate understanding of how much space the user is actually using in that directory, the enforcement of the restriction will not function correctly. The user will either be allowed to store more information in the directory than the user should, or the user will be restricted from using more space in a directory even though the user has not used as much space as the user has been allotted in the directory.

One solution to this problem is for the filter to rebuild its metadata information regarding the file system by canvassing the file system to determine its current state. For example, when a quota filter is installed on an existing system, the quota filter must query the file system for the size of each file that is relevant to the quota policies enforced by the quota filter, as well as any other relevant information (e.g. which user is associated with files). This querying is done in order to determine what the current usage is of the file system. However, a quota filter will be most useful on a system where there are a lot of files stored in the file system and where there are a lot of users. It is precisely in these cases that rebuilding a quota filter's metadata will take a long time. In order to rebuild a quota filter's metadata by querying the file system regarding all of several hundred thousand files stored on a system, hours may be needed. This presents a difficulty in a system which, for whatever reason, undergoes numerous unexpected shutdowns. Additionally, the delay during the rebuilding, presents an additional problem—during such rebuilding access to users is either denied, which causes service interruptions which will likely be inconvenient at best and intolerable at worst, or access to users is allowed, and because, during the rebuilding, the quota filter is not fully operational, allowing access may cause other problems which the quota system was intended to remedy.

SUMMARY

Efficient recovery of a state in which metadata is correct after a dirty shutdown is provided by tracking the reliability of metadata items.

In one embodiment, the system is a filter which tracks metadata information items, each metadata information item describing some state or data regarding the file system. Traffic to the file system is monitored, and the metadata is changed when relevant traffic is detected. When a command is encountered which may, if an event causes a problem with the file system, cause the file system to be inconsistent with the metadata (e.g. a rollback of an extending write, where usage metadata already reflects that the write has occurred) then an indication is maintained that the affected metadata items may be unreliable. Then, if such an event occurs, the metadata items marked as unreliable are the only ones which need to be rebuilt, recreated, or otherwise verified in order to ensure that the entire collection of metadata items is correct.

In one embodiment, reliability information is updated on an ongoing basis in order to determine if a metadata item marked as unreliable can now be considered definitively reliable again. This may occur, e.g., through the passage of time or the receipt of information from the file system that a transaction causing unreliability has committed. In one embodiment, time information regarding the unreliability information may be maintained in order to allow reliability information to be updated based on the passage of time.

The system storing metadata information may receive information regarding file system traffic incidentally to the operations of such a file system, or, in an alternate embodiment, the system storing metadata information may intermediate between the file system and the source of file system commands, for example in order to decrypt data or to enforce quotas, among other possible system tasks.

Other features and advantages of the invention may become apparent from the following detailed description of the invention and accompanying drawings.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION

Exemplary Computing Environment

Figure 1:
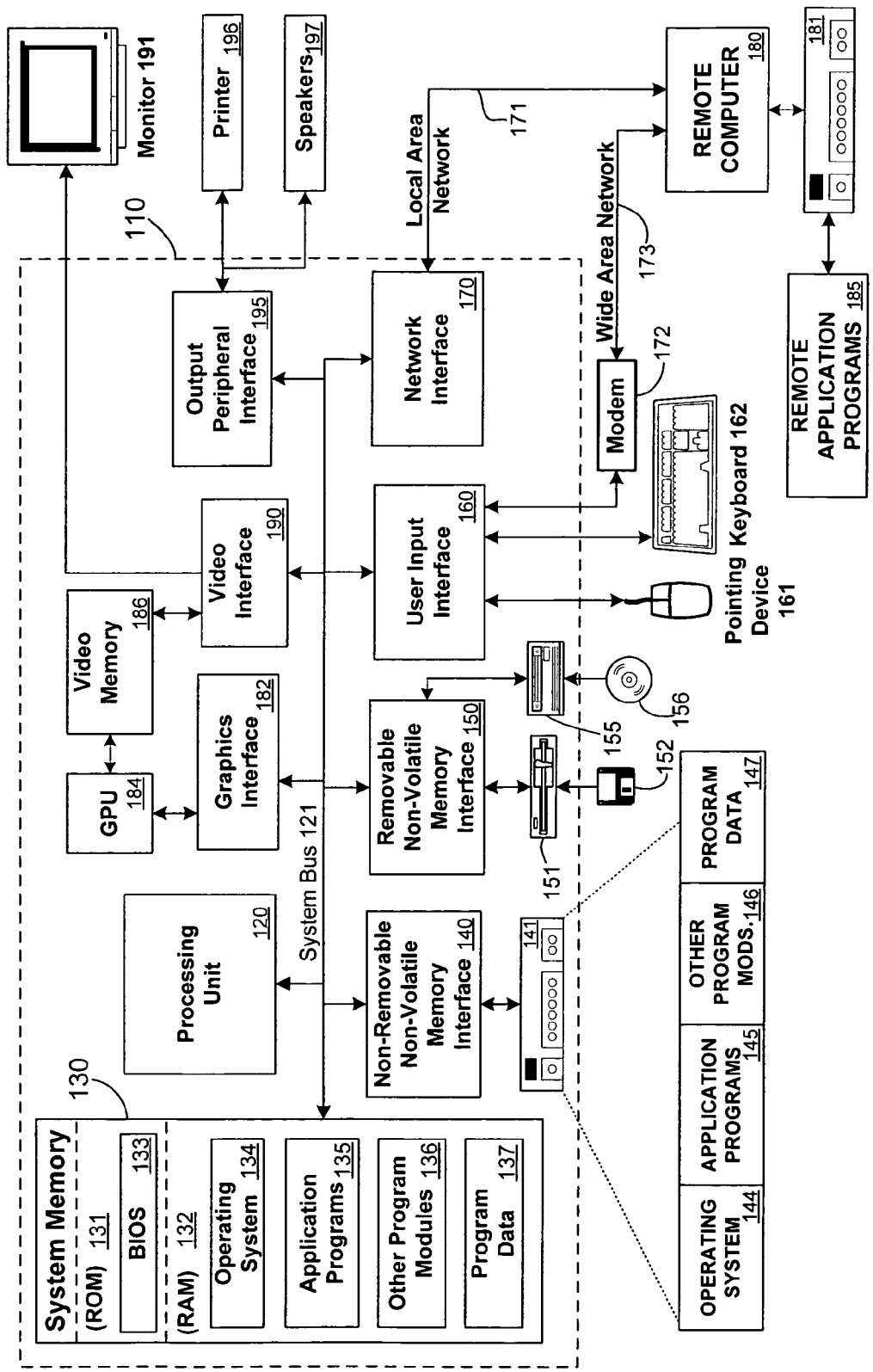
FIG. 1 is a block diagram of an exemplary computing environment in which aspects of the invention may be implemented.

FIG. 1 shows an exemplary computing environment in which aspects of the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary computing environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, embedded systems, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network or other data transmission medium. In a distributed computing environment, program modules and other data may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The processing unit 120 may represent multiple logical processing units such as those supported on a multi-threaded processor. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus). The system bus 121 may also be implemented as a point-to-point connection, switching fabric, or the like, among the communicating devices.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Recovering File System Metadata from Abnormal (Dirty) Shutdown

There are many different reasons and contexts in which file system metadata may be maintained. As described above, one such context is a quota filter which tracks the file system usage of different users. For example, a user may have a specific quota in a specific directory of the file system. The quota filter may maintain a tally of how much of that directory in the file system that user is using. This tally is file system metadata. Basically, any data which describes any state or aspect of the file system is file system metadata, e.g., how long the file system has been running, how many times a file has been written too, what files are stored in the file system, etc. File system metadata may also include data based on the data stored in the file system. For example, file system metadata may include a hash of the contents of a file, a copy of the first 128 bits of a file, or any other data based on file system data.

While metadata describes the file system, it may not be precise. For example, metadata regarding the usage of a file system may be ascertained by summing the size of the files written to the file system. However, the file system also stores some additional data. For example, the file system itself may store metadata concerning its own operations. As another example, the file system may store log data for unrolling interrupted transactions. Thus it may be impossible to determine how much space such additional data stored on the file system takes up. Thus, metadata regarding the usage of a file system may be an approximation. For example, if the total space used in a file system is being computed, but the space used by additional data is unknown, the metadata regarding file system space used may be an approximation, obtained by summing known usage and adding an overhead factor.

When file system metadata is being maintained, either by a filter or by another entity (application or other component of a computer system), as described above, a problem may exist if the file system shuts down abruptly. Such an abrupt (also termed "abnormal" or "dirty") shutdown may not give the file system an opportunity to complete operations in progress. While many file systems implement techniques which allow them to deal with such abnormal shutdowns without corruption of the file system, such techniques may cause the metadata maintained by an outside entity by tracking file system traffic to be increasingly inconsistent with the actual state of the file system. While a total shutdown of the file system is contemplated in using the term abnormal shutdown, any other occurrence which interferes with routine file system operations are also contemplated as abnormal shutdowns. For example, if a file system exists in two parts, and one part undergoes an abnormal shutdown, that may constitute an abnormal shutdown of the file system for the purposes of the current invention.

Figure 2:
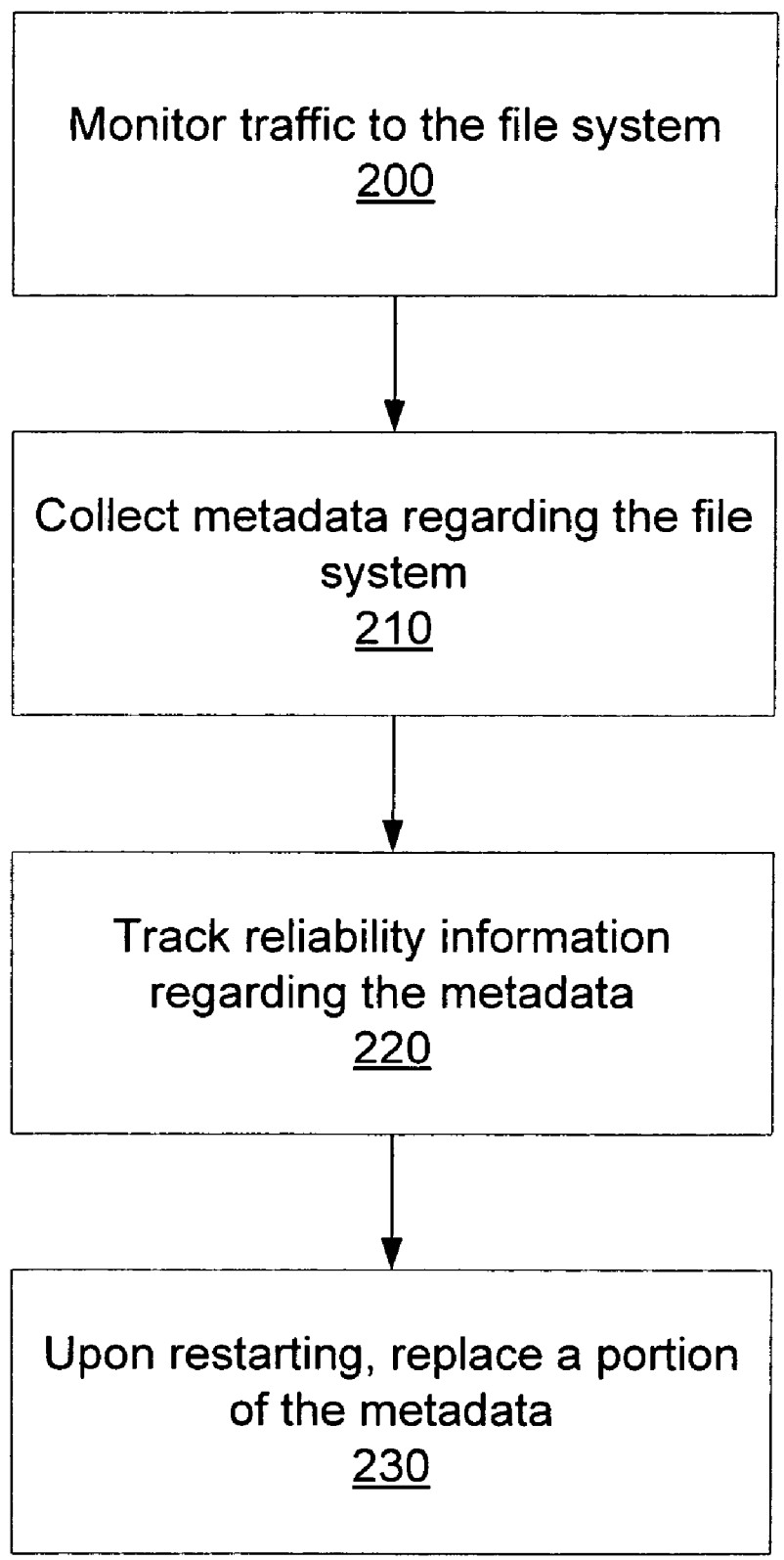
FIG. 2 is a flow diagram of a method for maintaining correct metadata regarding a file system according to one embodiment of the invention.

FIG. 2 is a flow diagram of a method for maintaining correct metadata regarding a file system according to one embodiment of the invention. While FIG. 2 shows steps of a method in series, the steps may be performed in any order, or in parallel. As shown in FIG. 2, in step 200, traffic to the file system is monitored. Thus, for example, if a write command is directed to the file system, that command will be part of traffic to the file system, and will be monitored in the method as shown in FIG. 2.

In step 210, metadata regarding the file system is collected using the monitored traffic. An entity collecting metadata may initialize its data in a number of ways. For example, if metadata is being collected regarding how much data is written to the file system in a given period of time, the entity initializes its metadata to zero. After the initialization, the entity uses the monitored traffic to add to the total sum so far by determining whether write commands are issued to the file system during the given period of time and adding the amount of data written to the file system by each command to a running total.

Metadata may also be initialized by querying the file system. Thus, the first time a quota system is implemented, the metadata stored by the quota system may be initialized by querying the file system. If the quota system is intended to track the usage by a group of five users, metadata concerning each user's usage may be obtained by making certain queries of the file system. If, later, a quota for a sixth user is added, metadata concerning usage by the sixth user may also be obtained by making queries of the file system. However, ongoing maintenance of the metadata can be achieved by monitoring traffic, as shown in steps 200 and 210.

While metadata is being collected, reliability information regarding the metadata is also collected in step 220. The reliability information describes which items from all metadata items collected may be inaccurate in the case of an abnormal shutdown of the file system. Thus, in some embodiments, reliability information indicates that a particular metadata item contains some information based on a command to the file system which may be rolled back or otherwise changed in the event of an abnormal shutdown of a file system.

In one example, a quota system is implementing a quota for a given user for usage on a given directory, and one item UQ of metadata tracks that user's usage of the given directory. The metadata item UQ is changed when a relevant command has been issued to the file system (e.g. a write to the given directory by the user), but the command might be rolled back or otherwise might not act in the way reflected by the new value of metadata item UQ in the case of an abnormal shutdown of the file system. For example, the command might be an extending write command which, if completed, will change the user's usage of the file system in the given directory. However, if the file system encounters an abnormal shutdown before the completion of the extending write, the extending write may be rolled back by the file system, and thus the write is not completed and should not count against the user's usage of the file system. In such a case, according to one embodiment of the present invention, when the extending write command is issued, the metadata item UQ regarding the user's usage of the given directory is changed to reflect the extending write (in step 210) but reliability information is stored which indicates that the metadata item UQ may be inaccurate in the case of an abnormal shutdown.

As part of step 220, the reliability information is updated on an ongoing basis. Thus, if at a later point in time the metadata item UQ is determined to now be reliable in the case of an abnormal shutdown, the reliability information is changed to reflect that. For example, where an extending write is issued, affecting metadata item UQ and causing reliability information to be stored indicating that metadata item UQ may not be reliable in the case of an abnormal shutdown, the reliability information is changed to reflect a later determination that the metadata item UQ is reliable. In certain file systems, there is a guarantee that all extending writes will complete in a given timeframe. Thus, if the command affecting the metadata item UQ and causing it to be possibly unreliable in the case of an abnormal shutdown was issued, but the file system guarantees that extending writes will be completed within time $T_{EW}$, then after time $T_{EW}$ has elapsed, the metadata can be considered reliable (if no further commands which affect its reliability have been issued) and the reliability information is updated to reflect that.

As shown in step 230, upon restarting, a portion of the metadata is replaced. The portion of the metadata to replace is not the entirety of the metadata. The portion of the metadata to be replaced is determined by consulting the reliability information. Thus, in one embodiment, the portion of the metadata which has been determined to be unreliable in the event of an abnormal shutdown is replaced. In one embodiment, the portion of the metadata is replaced by consulting the file system. Thus, where a quota system maintains metadata, a portion of which describes a particular user's usage of a particular directory in the file system, and upon restarting it is determined that that portion is unreliable, the quota system may query the file system to determine what the particular user's usage of the particular directory is. Because not all of the metadata is rebuilt in this way, but only the portions indicated as unreliable by the reliability information, a savings in time and effort to rebuild metadata which is reliable is realized, without compromising the overall reliability of the metadata.

Using Flags and Timestamps to Track Reliability Information

In one embodiment, the tracking of the reliability in step 230 is tracked by storing a flag and a timestamp for each portion of metadata. The flag indicates that the portion of metadata is unreliable because it reflects information regarding a command to the file system which may cause the metadata to be unreliable. Thus, in a quota system, where metadata item UQ describing a user's usage of a resource is affected by an extending write, and where such an extending write may cause unreliability in the event of an abnormal shutdown, the flag would be set to indicate that metadata item UQ is unreliable. In one embodiment, the flag is a bit which is set one way to indicate unreliability and another if no unreliability is indicated.

The tracking of reliability in step 220 may be tracked simply with such a flag. However, in order to allow an indication of unreliability in a flag to be corrected if possible (for example, if the indication is due to an extending write, if after a certain period of time has passed the file system guarantees that the extending write will not be rolled back, and if that period of time has passed), in an alternate embodiment, a timestamp is also tracked which indicates the last time that an event has occurred which causes the metadata item UQ to be unreliable. If all such events pose no threat to reliability after a given period of time has passed, then, a periodic process can review a metadata item's timestamp, and if the timestamp indicates that that given period of time has passed since any possible problematic change to the metadata item, the flag can be set so it no longer indicates unreliability.

This periodic process of reviewing reliability information may be implemented in a "scavenger thread." In one embodiment, such a scavenger thread periodically (1) examines all the reliability information for all metadata items, (2) determines if an indication of unreliability is sufficiently aged to be reversed, and (3) when it finds an indication of reliability which has sufficiently aged, changing the reliability information so that it no longer indicates unreliability of the corresponding metadata item. In some embodiments, a lock is obtained on the reliability information during the operation of the scavenger thread in order to ensure that reliability information is not changed during the operation of the scavenger thread.

In embodiments where a flag and timestamp are kept, if the flag indicates unreliability for a specific metadata item due to a first command, where the timestamp indicates a time related to that first command, and where a new command is detected in the file system traffic which changes the metadata but may, in the case of an abnormal shutdown, make the metadata unreliable, then the timestamp is updated to indicate the time of the new command. The flag remains set to indicate unreliability.

If the tracking of reliability is done on a storage system which caches changes before writing them to more permanent storage, there may be a problem because an abnormal shutdown may causes a change in the reliability information to be lost. In such a case, when the system restarts, there may be unreliable metadata, but there will be no indication that such metadata is unreliable. In one embodiment of the invention, in order to ensure that the reliability information is maintained, when the flag is set to indicate unreliability, the new flag state is flushed from the cache to the disk. This flushing ensures that the unreliability information is not lost in the same abnormal shutdown which causes the metadata to be unreliable.

In some embodiments, the flushing of reliability information regarding a change in metadata due to a command which may cause such metadata to be unreliable in case of dirty shutdown will occur before the execution of the command. As described above, in some such embodiments, metadata is tracked by a filter which filters file system traffic, and can delay or prevent delivery of file system traffic to the file system. In some such embodiments, if a file system request causes a reliability information change which is flushed as described above, the file system request will not be forwarded through the filter to the file system until the flushing of the reliability information has ensured that the reliability information will not be lost in the case of an abnormal shutdown. In other such embodiments, the entity tracking metadata does not block file system traffic until the flush is completed, but the system functions in such a way as to make it true that the execution will be blocked until flushing is completed. For example, the file system may include a delay in operations after receiving a request for some other reason which is longer than the longest possible delay in flushing. In such a case, no holding of a request is necessary for it to be the case that the flushing of unreliability information will be competed before the execution of the command causing the metadata to possibly be unreliable.

In another embodiment, no timestamp is maintained, and a scavenger thread makes two passes through the reliability information. In its first pass, it sets the cache value for all flags to indicate reliability. In this embodiment, the cache value is never automatically sent to the hard disk, but remains as a cache value until it is flushed. Between the first pass and the second pass, file system requests may change some flags to indicate unreliability, and when such a change occurs, the flag indicating unreliability is flushed from the cache to the disk.

After the passage of a period (e.g. N minutes) of time, the scavenger thread performs a second pass. During this second pass, if a flag in the cache still indicates reliability, during the N minutes, no reason has been found why the associated metadata might be unreliable. Thus, the indication of reliability is flushed to the cache. This flushing may overwrite a previous unreliability indication in the cache for the associated metadata. In this way, if an indication of unreliability is stale (at least N minutes old) and no new reason has been encountered for the metadata to be considered unreliable, the indication of unreliability is overwritten in the second pass. The time between the two passes, in one embodiment, is a sufficient time for any possible reason for unreliability to be fully resolved, so that a dirty shutdown would not cause a rollback or other change not reflected in the metadata.

While this embodiment has been described with reference to cached values and flushing to a hard disk, any other means of maintaining the information regarding which values are considered unreliable (the flushed-to-disk values described above) and information regarding which values have not been marked as unreliable since a first pass (the cached values described above) can also be used.

Metadata Storage System

Figure 3:
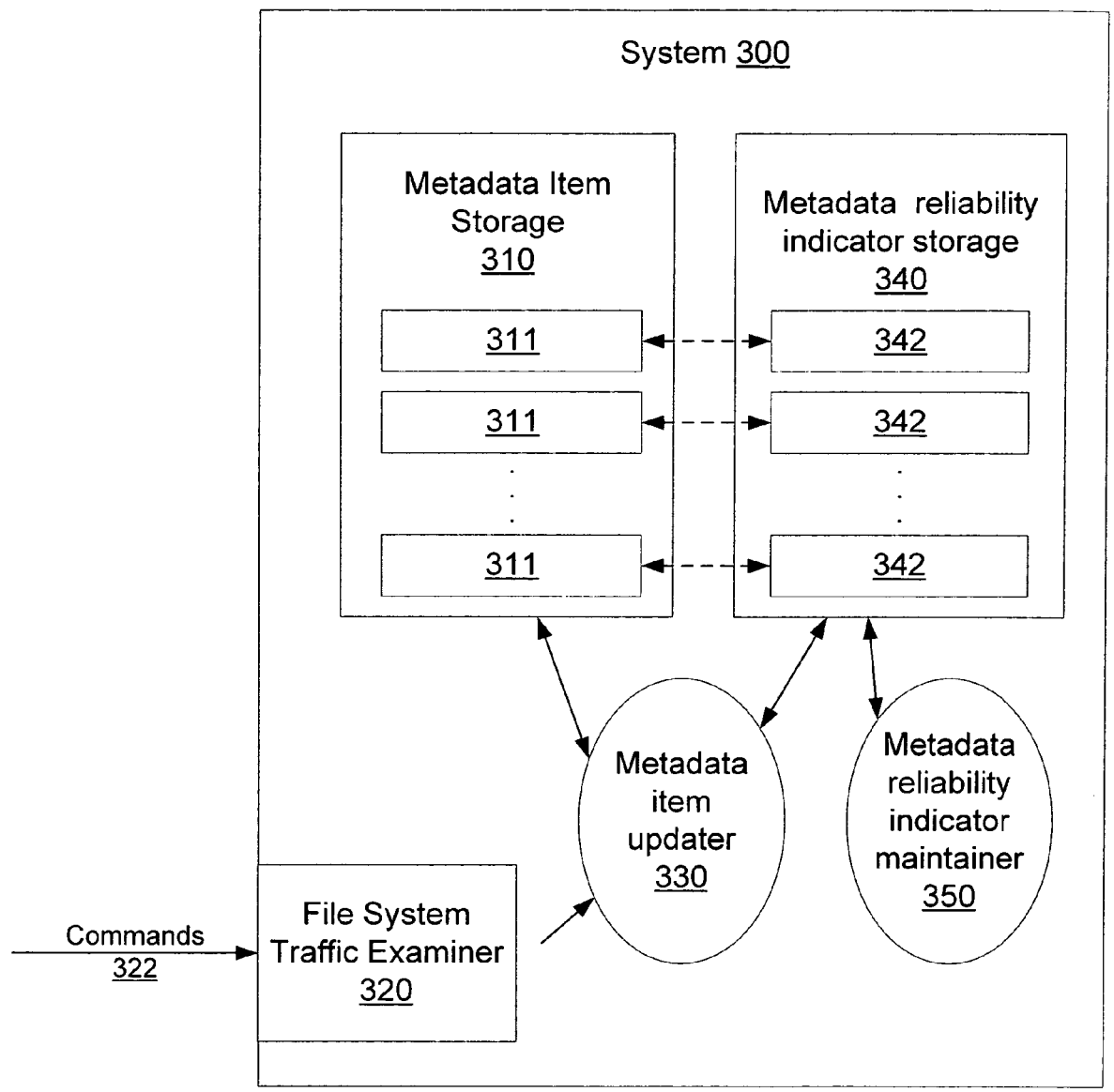
FIG. 3 is a block diagram of a system for storing metadata according to one embodiment of the invention.

A metadata storage system, according to one embodiment of the invention, is used in order to store and maintain metadata. FIG. 3 is a block diagram of a system for storing metadata according to one embodiment of the invention.

As shown in FIG. 3, a system 300 for storing metadata comprises metadata item storage 310. Metadata item storage 310 stores metadata items 311. Additionally, a file system traffic examiner 320 examines commands 322 directed at the file system. A metadata item updater 330 operably connected to the metadata item storage 310 and the file system traffic examiner updates the metadata items 311 in order to cause those metadata items 311 to be consistent with the state of the file system as reflected in any of the commands 322 which affect the file system in a way tracked by any of the metadata items 311. Thus, a metadata item 311 tracks a user's usage of a specific directory, and one of the commands 322 indicates that the user has deleted a file in the specific directory, the metadata item updater 330 would update that metadata item 311 to reflect the change in the user's usage of the specific directory.

In addition, in system 300, a metadata reliability indicator storage 340 stores an indication 342 corresponding to each metadata item, describing the reliability of the metadata item in the case of an abnormal shutdown. For example, the metadata reliability indicator storage may store a flag and timestamp, as described above, for each metadata item. As described above, the metadata reliability indication 342 may indicate that a command which may be rolled back in case of an abnormal shutdown, such as an extending write command, has affected the metadata item 311.

As described above, if a change an indication 342 stored in metadata reliability indicator storage 340 is cached and not written to disk, then that change may be lost in the case of an abnormal shutdown. In some embodiments of the invention, said metadata reliability indicator storage 340 flushes a change in an indication 342 to disk in order to prevent that. In one embodiment where a flag and timestamp are stored, as described above, the flag portion of indication 342 is flushed to disk each time the flag is changed from a setting which does not indicate possible unreliability to a setting which indicates possible unreliability. In such an embodiment, the flag need only be flushed to disk when it is changed to a setting which indicates unreliability. If the flag is already set to a setting which indicates unreliability, then that change has already been flushed to disk because a change to such a setting is always flushed to disk, and the flag portion of the indication 342 need not be flushed to disk.

The system 300 also includes a shutdown recoverer 350, which refreshes any of the metadata items 311 which were in an unreliable state when shutdown occurred, as indicated by the indications 342 stored in metadata reliability indicator storage 340.

The refreshing of metadata may be accomplished by querying the file system to determine information necessary to rebuild the metadata item 311. In one embodiment, this consists of requesting all information necessary to create the metadata item 311. In another embodiment, information regarding the unreliable transactions which affect the metadata item 311 is stored, and the refresh of the metadata item 311 is performed by querying the file system regarding the results of those transactions. In alternate embodiments, a metadata item 311 is refreshed by reading metadata information from an alternate source of metadata.

In one embodiment the system 300 includes a metadata reliability indicator maintainer 350. The reliability indicator maintainer 350 maintains the indications 342 stored in the metadata reliability storage maintainer 340. Thus, if as described above, an indication 342 comprises a flag indicating that a specific corresponding metadata item 311 is unreliable and a timestamp corresponding to the time of the last command causing such unreliability, the metadata reliability indicator maintainer 350 determines if enough time has elapsed that the specific metadata item 311 is now reliable, and sets the indication 342 corresponding to the specific metadata item 311 to indicate reliability. This reliability indicator maintainer 350 in one embodiment implements a scavenger thread as described above.

In an alternate embodiment, the file system can indicate that it has completed all operations, and upon the receipt of such an all-complete indication from the file system, the metadata reliability indicator maintainer 350 sets all indications 342 to indicate reliability. In one such alternate embodiment where indications 342 contain a timestamp, all indications 342 with a timestamp indicating they were set before the time of the all-complete indication from the file system are set to indicate reliability for the corresponding metadata item 311.

In one embodiment, the metadata reliability indicator maintainer 350 includes a normal shutdown component which reacts to a clean shutdown of the system 300 by setting all indications 342 to indicate reliability.

Figure 4:
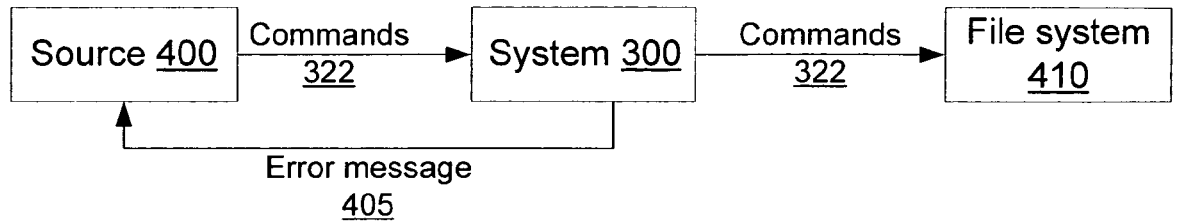
FIG. 4 is a block diagram of a system for storing metadata according to another embodiment of the invention.

As shown in FIG. 3, the system 300 may examine commands 322 which are sent to a file system. These commands may be sent through system 300 or may be sent separately to the file system. However, as shown in FIG. 4, in one embodiment a system 300 sits between a source 400 of such commands 322 and the file system 410, mediating between them, and may prevent certain commands 322 from reaching the file system 410. For example, where the system 300 is implementing a quota system, a command 322 may indicate that a user is requesting a write to a specific directory. However, the quota system implemented by the system 300 may contain a limitation on how much space the user can use in the specific directory, and a metadata item 311 may indicate that the command 322 would cause the user to exceed that allowable space used. In such a case the command 322 would not be sent to the file system 410. In one embodiment, as pictured, in such a case an error message 405 would be sent back to the source 400 of the command to indicate that the command was not carried out and the reason that it was not carried out.

In one embodiment of a system as shown in FIG. 4, data from the file system 410 (for example, responsive to a request to read a file from the data system) is provided directly from the file system 410. In other embodiments, data from the file system is provided to system 300, which then sends the data (possibly changed in some way) back to the requesting entity. For example, as described below, an encryption system may be implemented by the system 300, in which case the system encrypts data being stored in the file system 410 and decrypts requested data from file system 410 before providing the data to the requesting entity.

While a quota system has been used to describe the functionality of the system 300, there are alternate uses for a system 300 in the configuration shown in FIG. 3 or FIG. 4. For example, an encryption system which encrypts and decrypts some or all information stored in the file system 410 may be implemented with such a system.

In order to use a system 300 to encrypt data, in one embodiment the source 400 of commands and the system 300 are secured by some security means. The file system 410, however, is not secured. The source 400 sends requests for storing data in the file system 410 via the system 300. While in the system 300 the data is encrypted. The encrypted data is sent to the file system 410 for storage. When data is retrieved from the file system 410, the request to retrieve data is sent from the source 400 to the system 300, which retrieves the data from the file system 410 and decrypts it, returning decrypted data to the source 400.

In addition to quota systems and encryption systems, other systems maintaining file system metadata are contemplated by the invention.

Recalculating Metadata

Figure 5:
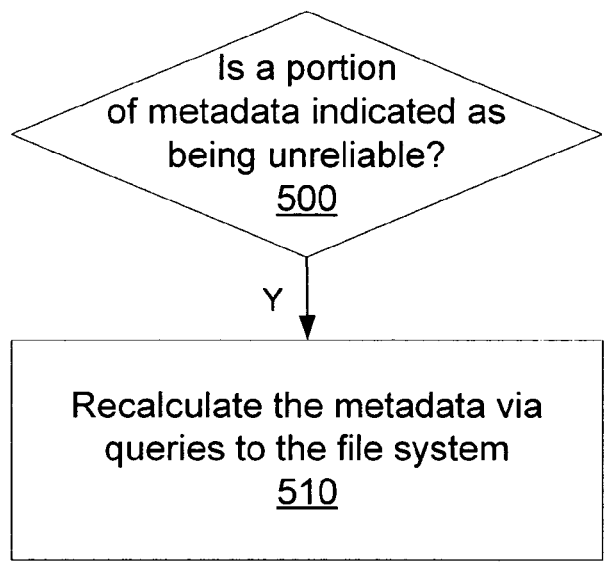
FIG. 5 is a flow diagram detailing post-shutdown recovery according to one embodiment of the invention.

A restoration process is shown in FIG. 5 for post-shutdown recovery. As shown in FIG. 5, in step 500 a determination is made as to whether stored reliability information regarding a portion of metadata indicates that that metadata was changed before shutdown due to a command which may not have completed before shutdown. In step 510, if the determination is that the metadata was changed as the result of a command which may not have completed, the metadata is recalculated via queries to the file system.

CONCLUSION

It is noted that the foregoing examples have been provided merely for the purpose of explanation and are in no way to be construed as limiting of the present invention. While the invention has been described with reference to various embodiments, it is understood that the words which have been used herein are words of description and illustration, rather than words of limitations. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

What is claimed:

1. A method for maintaining correct metadata regarding a file system, said method comprising:

monitoring traffic to said file system;

collecting metadata regarding said file system using said monitored traffic;

tracking reliability information regarding which of said collected metadata may be inaccurate in case of an abnormal shutdown of said file system; and upon restarting, replacing a portion of said metadata by requesting information from said file system, said portion determined using said reliability information, where said portion is not equal to all of said metadata, wherein said step of tracking reliability information comprises:

identifying when said monitored traffic comprises a first command to said file system which will cause a specific portion of said metadata to be unreliable when said file system undergoes an abnormal shutdown;

storing a flag value associated with said specific portion, said flag value indicating, when said determination is that said monitored traffic includes a command to said file system which will cause said specific portion of said metadata to be unreliable, that said portion should be replaced upon restarting; and identifying when a prescribed period of time has elapsed in which no command to said file system has been issued which will cause said specific portion of said metadata to be unreliable, then changing said flag value to indicate that said specific portion need not be replaced upon restarting.

2. The method of claim 1, where said step of tracking reliability information comprises:

storing a timestamp associated with said specific portion, said timestamp indicating a time related to the issuance of said first command.

3. The method of claim 2, where said step of storing a timestamp further comprises, if said monitored traffic comprises a second command to said file system which will cause said specific portion of said metadata to be unreliable if said file system undergoes an abnormal shutdown, changing said timestamp to indicate a time related to the issuance of said second command.

4. The method of claim 2, where said metadata is stored in a way which may not survive if the storage undergoes an abnormal shutdown before data is flushed from a cache to a disk, where said step of storing a flag associated with said specific portion comprises: if said flag value is changed to a flag value indicating that said portion should be replaced upon restarting, issuing a command which will cause said flag value to be flushed to said disk.

5. The method of claim 4, where said flushing of said flag value to said disk occurs before said first command is executed.

6. The method of claim 1, where said step of determining if a prespecified period of time has elapsed in which no command to said file system has been issued which will cause said specific portion of said metadata to be unreliable comprises consulting said timestamp.

7. A system for storing metadata, said metadata describing a file system, said system comprising:

a metadata item storage storing at least one metadata item;

a file system traffic examiner that examines commands directed at said file system;

a metadata item updater that updates one of said at least one metadata items based on one or more of said commands, said metadata item updater operably connected to said metadata item storage and said file system traffic examiner;

a metadata reliability indicator storage that stores, for each of said metadata items, an indication corresponding to said metadata item, said indication indicating whether said corresponding metadata item has been recently updated in a possibly problematic way, said metadata reliability indicator storage operably connected to said metadata item updater, said metadata reliability indicator storage comprising: (a) a flag corresponding to each of said at least one metadata items, where said flag is set in a first way to indicate that the corresponding metadata item has been recently updated in said possibly problematic way, and where said flag is set in a second way to indicate that the corresponding metadata has not been recently updated in said possibly problematic way; and (b) a timestamp corresponding to each of said at least one metadata items, where said timestamp indicates the last time that said corresponding metadata item was updated in said possibly problematic way;

a metadata reliability indicator maintainer, operably connected to said metadata reliability indicator storage, said metadata reliability indicator maintainer, when an update of a metadata item in said possibly problematic way is detected, sets said flag corresponding to said metadata item in said first way and updates said timestamp corresponding to said metadata item to correspond to a time of said update, and said metadata reliability indicator maintainer clearing said flag when said metadata item has not been recently updated in said possibly problematic way; and a shutdown recoverer that, upon resumption after a shutdown, refreshes each metadata storage item which is indicated by said metadata reliability indicator storage to have been recently updated.

8. The system of claim 7, where an indication that said corresponding metadata item has been recently updated in a possibly problematic way comprises an indication that said corresponding metadata item has been recently updated due to any command directed at said file system which may be rolled back if interrupted by a dirty shutdown.

9. The method of claim 7, where said metadata reliability indicator storage changes said indication if said metadata item has not been updated since a file system indication that said file system has completed all operations that could be interrupted by a dirty shutdown.

10. The system of claim 7, where said metadata reliability indicator maintainer further, if said flag corresponding to said metadata item was set in said second way before said update, flushes at least a portion of said metadata reliability indicator storage to disk.

11. The system of claim 10, where said flushing of at least a portion of said metadata reliability indicator storage to disk occurs before a command on which said update is based is executed.

12. The system of claim 7, where said shutdown recoverer refreshes each metadata storage item which is indicated by said metadata reliability indicator storage to have been recently updated in said possibly problematic way by performing queries on said file system.

13. The system of claim 7, where said metadata reliability indicator storage further comprises:

a normal shutdown component for, if a normal shutdown is detected, changing each of said indications corresponding to each metadata item to indicate that said corresponding metadata item has not been recently updated in said possibly problematic way.

14. The system of claim 7, where at least one of said metadata items comprises data regarding the usage of said file system by a specific user, and where said system further comprises:
a file system traffic blocker for blocking a command directed at said file system, where said command would cause said specific user's usage of said file system to exceed specified parameters.

15. A computer-readable memory medium containing instructions for controlling a computer system to restore metadata about a file system by performing the steps of:
for each portion of metadata, determining whether stored information regarding said portion indicates that said portion of metadata was, prior to a shutdown, changed based on a command to said file system which said file system may not have completed before said shutdown; and
querying said file system to recalculate each portion of metadata for which it was determined that said stored information regarding said portion indicates that said portion of metadata was, prior to a shutdown, changed based on a command to said file system which said file system may not have completed before said shutdown,
wherein said step of tracking reliability information comprises:
identifying when said monitored traffic comprises a first command to said file system which will cause a specific portion of said metadata to be unreliable if said file system undergoes an abnormal shutdown;
storing a flag value associated with said specific portion, said flag value indicating, when said determination is that said monitored traffic includes a command to said file system which will cause said specific portion of said metadata to be unreliable, that said portion should be replaced upon restarting; and
identifying when a prescribed period of time has elapsed in which no command to said file system has been issued which will cause said specific portion of said metadata to be unreliable, then, changing said flag value to indicate that said specific portion need not be replaced upon restarting;
storing a timestamp associated with said specific portion, said timestamp indicating a time related to the issuance of said first command,
further wherein said step of identifying when a prescribed period of time has elapsed in which no command to said file system has been issued which will cause said specific portion of said metadata to be unreliable comprises consulting said timestamp.

* * * * *